(12) United States Patent
Kim et al.

(10) Patent No.: US 11,123,717 B2
(45) Date of Patent: Sep. 21, 2021

(54) CATALYST FOR OXYGEN REDUCTION REACTION AND OXYGEN EVOLUTION REACTION AND METHOD FOR MANUFACTURING OF THE SAME

(71) Applicant: Korea University Research and Business Foundation, Seoul (KR)

(72) Inventors: Dong-Wan Kim, Seoul (KR); Bobae Ju, Seoul (KR); Hee Jo Song, Seoul (KR); Hyunseok Yoon, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 64 days.

(21) Appl. No.: 16/535,495

(22) Filed: Aug. 8, 2019

(65) Prior Publication Data

US 2020/0376469 A1    Dec. 3, 2020

(30) Foreign Application Priority Data

May 30, 2019    (KR) .................. 10-2019-0064014

(51) Int. Cl.
| | | |
|---|---|---|
| *B01J 27/045* | (2006.01) | |
| *B01J 37/20* | (2006.01) | |
| *B01J 35/00* | (2006.01) | |
| *B82Y 40/00* | (2011.01) | |

(52) U.S. Cl.
CPC ......... *B01J 27/045* (2013.01); *B01J 35/0033* (2013.01); *B01J 37/20* (2013.01); *B82Y 40/00* (2013.01); *C01P 2004/20* (2013.01); *C01P 2004/90* (2013.01)

(58) Field of Classification Search
CPC ...... B01J 27/043; B01J 35/0033; B01J 37/20; B01J 37/105; B01J 20/3078; B82Y 40/00; C01P 2004/20; C01P 2004/90

USPC ................................................ 502/222, 337
See application file for complete search history.

(56) References Cited

U.S. PATENT DOCUMENTS

| | | | | |
|---|---|---|---|---|
| 6,932,955 | B2 * | 8/2005 | Yamamoto | ........... C01G 45/006 |
| | | | | 423/518 |
| 9,327,274 | B2 * | 5/2016 | Han | ........ B01J 35/002 |
| 2020/0208287 | A1 * | 7/2020 | Yang | ...... C25D 3/562 |

FOREIGN PATENT DOCUMENTS

| | | | | |
|---|---|---|---|---|
| CN | 1526648 | * | 9/2004 | ............. B82B 1/00 |
| CN | 10 2633309 | * | 8/2012 | ............. B82Y 40/00 |
| CN | 102633309 A | | 8/2012 | |
| CN | 103466726 | * | 12/2013 | ............. B82Y 30/00 |
| CN | 103938188 | * | 7/2014 | ............. C01G 53/11 |
| CN | 10 6498430 | * | 3/2017 | ............. B01J 27/043 |
| CN | 106498430 A | | 3/2017 | |
| CN | 108502934 | * | 9/2018 | ............. B82Y 30/00 |

(Continued)

OTHER PUBLICATIONS

Joseph Sahaya Anand et al., "Electrosynthesized NiS2 thin films and their optical and semiconductor studies." Reports in Electrochemistry, vol. 3, pp. 25-29. (Year: 2013).*

(Continued)

*Primary Examiner* — Patricia L. Hailey
(74) *Attorney, Agent, or Firm* — NSIP Law

(57) ABSTRACT

Disclosed is a catalyst for oxygen reduction and evolution reactions. The catalyst is in the form of nickel sulfide ($NiS_2$) nanosheets. $NiS_2$ molecules are cross-linked and oriented two-dimensionally in the $NiS_2$ nanosheets. Also disclosed is a method for producing the catalyst.

8 Claims, 8 Drawing Sheets

(56) References Cited

FOREIGN PATENT DOCUMENTS

| CN | 109637825 | * | 4/2019 | ............ B82Y 30/00 |
| CN | 110052277 | * | 7/2019 | ............ B01J 27/043 |
| CN | 11 0538663 | * | 12/2019 | ............ B01J 27/043 |
| CN | 110538663 A | | 12/2019 | |
| JP | 2002 289266 | * | 10/2002 | ............ H01M 12/06 |
| JP | 2002-289266 A | | 10/2002 | |
| KR | 10-2014-0039755 A | | 4/2014 | |

OTHER PUBLICATIONS

Desheng Kong et al., "First-row transition metal dichalcogenide catalysts for hydrogen evolution reaction." Energy and Environmental Science, 6, pp. 3553-3558. (Year: 2013).*

Qiuyu Ma et al., "Identifying the electrocatalytic sites of nickel disulfide in alkaline hydrogen evolution reaction." Nano Energy 41, pp. 148-153. (Year: 2017).*

Qin Pan et al., "Facile one-pot synthesis of ultrathin NiS nanosheets anchored on graphene and the improved electrochemical Li-storage properties." RSC Advances 3, pp. 3899-3906. (Year: 2013).*

Lili Wang et al., "Hydrothermal synthesis of NiS nanobelts and NiS2 microspheres constructed of cuboids architectures." Journal of Solid State Chemistry 183, pp. 223-227. (Year: 2010).*

Liang, Zhen-Hua et al., "β-Nickel Hydroxide Nanosheets and Their Thermal Decomposition to Nickel Oxide Nanosheets", *The Journal of Physical Chemistry*, Feb. 25, 2004 (pp. 3488-3491).

Tang, Chun et al., "NiS2 nanosheets array grown on carbon cloth as an efficient 3D hydrogen evolution cathode", *Electrochimica Acta*, Jan. 20, 2015 (pp. 508-514).

Huang, Taizhong et al., "Electrocatalytic performance of cubic NiS2 and hexagonal NiS for oxygen reduction reaction", *Journal of Catalysis*, vol. 359, Mar. 2018 (pp. 223-232).

Korean Office Action dated Sep. 15, 2020 in counterpart Korean Patent Application No. 10-2019-0064014 (6 pages in Korean).

Iwaya, Wataru et al., "Synthesis and Cathodic Performance of Metal-Sulfides as Electrocatalysts", Department of Applied Chemistry, Kyushu Institute of Technology, *The Committee of Battery Technology, The Electrochemical Society of Japan*, Nov. 13, 2007 (pp. 1-2).

Japanese Office Action dated Nov. 24, 2020 in counterpart Japanese Patent Application No. 2019-210342 (3 pages in Japanese).

Wu, Tianxing, et al., "Vapor-Phase Hydrothermal Growth of Single Crystalline NiS 2 Nanostructure Film on Carbon Fiber Cloth for Electrocatalytic Oxidation of Alcohols to Ketones and Simultaneous H2 Evolution," Nano Research, 11, 2, 2018 (pp. 1004-1017).

Korean Notice of Allowance dated Jul. 21, 2021 in counterpart Korean Patent Application No. 10-2019-0064014 (3 pages in Korean).

\* cited by examiner ism and concept of the invention based on the principle according to which the inventor can properly define the concept of the terms to best describe the invention.

CATALYST FOR OXYGEN REDUCTION REACTION AND OXYGEN EVOLUTION REACTION AND METHOD FOR MANUFACTURING OF THE SAME

CROSS-REFERENCE TO RELATED APPLICATIONS

This application claims the benefit under 35 USC § 119(a) of Korean Patent Application No. 10-2019-0064014 filed on May 30, 2019 in the Korean Intellectual Property Office, the entire disclosure of which is incorporated herein by reference for all purposes.

BACKGROUND OF THE INVENTION

1. Field of the Invention

The present invention relates to a catalyst for oxygen reduction and evolution reactions and a method for producing the same. More specifically, the present invention relates to a technology for synthesizing two-dimensional structured $NiS_2$ nanosheets for use in a catalyst for a cathode of a lithium-air battery.

2. Description of the Related Art

As one approach to preparing countermeasures against the depletion of fossil fuel reserves or high oil prices, considerable research has concentrated on secondary batteries in line with the increasing interest in energy storage technology. Particularly, metal-air batteries have higher energy density than other secondary batteries due to the unlimited supply of oxygen from air. Of these, lithium-air batteries using lithium (Li) as an anode are estimated to have higher energy density than other next generation secondary batteries subsequent to lithium ion secondary batteries. A typical lithium-air battery is composed of a cathode, an anode, an electrolyte, and a separator. When the battery is discharged, lithium metal is oxidized at the anode to produce lithium ions and electrons. The lithium ions and the electrons move to the cathode through the electrolyte and circuit, respectively. Oxygen is reduced by the electrons at the cathode to form $Li_2O_2$. When the battery is charged, reverse reactions occur. That is, the lithium compound is decomposed to evolve oxygen gas at the cathode and the lithium ions are reduced at the anode.

To sum up, the oxygen reduction reaction (ORR) occurs during discharge and the oxygen evolution reaction (OER) occurs during charge at the cathode of the lithium-air battery. A problem encountered in conventional lithium-air batteries developed hitherto is that it is substantially impossible to reduce the difference in overpotential between the oxygen reduction reaction and the oxygen evolution reaction, failing to achieve relatively high electroactivity. This is most strongly associated with the discharge product ($Li_2O_2$) formed during discharge. The solid discharge product formed on the surface of the electrode by the oxygen reduction reaction when discharged covers the electrode surface as the discharge proceeds. Thereafter, the solid discharge product prevents lithium ions and oxygen from being in contact with the electrode surface when its thickness reaches a predetermined level, and as a result, the discharge reaction does not proceed further. The decomposition of the discharge product requires more energy during charge due to the very low electrical conductivity of the discharge product. Thus, the practically achievable maximum capacity and energy efficiency of the lithium-air battery are inevitably greatly affected by the characteristics of the electrodes.

The use of a catalyst at the cathode is required to reduce the overpotential between the oxygen reduction reaction and the oxygen evolution reaction. However, as disclosed in Korean Patent Publication No. 10-2014-0039755 A, the use of expensive precious metals, mainly platinum (Pt), in conventional catalysts is an obstacle to the commercialization of the catalysts.

Thus, there is an urgent need to develop a novel inexpensive catalyst with high activity and stability.

SUMMARY OF THE INVENTION

The present invention has been made in an effort to solve the problems of the prior art, and one aspect of the present invention is to provide a bifunctional catalyst based on two-dimensional structured nickel sulfide for oxygen reduction/evolution reactions.

A further aspect of the present invention is to provide a method for producing a nickel sulfide catalyst, including synthesizing a two-dimensional structured nickel hydroxide precursor by hydrothermal synthesis and subjecting the nickel hydroxide precursor to a solid/gas phase reaction.

A catalyst for oxygen reduction and evolution reactions according to one embodiment of the present invention is in the form of nickel sulfide ($NiS_2$) nanosheets wherein $NiS_2$ molecules are cross-linked and oriented two-dimensionally.

The catalyst for oxygen reduction and evolution reactions may be used for a cathode of a lithium-air battery.

The $NiS_2$ nanosheets may have a single crystalline structure.

The {200} crystal plane of the $NiS_2$ nanosheets may be exposed.

A method for producing a catalyst for oxygen reduction and evolution reactions according to one embodiment of the present invention includes synthesizing a nickel hydroxide ($Ni(OH)_2$) nanosheet precursor in which $Ni(OH)_2$ molecules are cross-linked and oriented two-dimensionally, and reacting the $Ni(OH)_2$ nanosheet precursor with sulfur to synthesize nickel sulfide ($NiS_2$) nanosheets.

The synthesis of the $Ni(OH)_2$ nanosheet precursor may include adding an ammonium solution to a solution of nickel acetate in deionized water to prepare a mixed solution and subjecting the mixed solution to hydrothermal synthesis.

The method may further include cleaning with a cleaning liquid and drying after the hydrothermal synthesis.

The ammonium solution may be added in such an amount that the pH of the mixed solution is 9 to 11.

The hydrothermal synthesis may be performed at 160 to 210° C.

The $NiS_2$ nanosheets may be synthesized by annealing the sulfur powder and reacting the resulting sulfur vapor with the $Ni(OH)_2$ nanosheet precursor.

The $NiS_2$ nanosheets may be synthesized by reaction of the $Ni(OH)_2$ nanosheet precursor and the sulfur powder in a molar ratio of 1:5-25.

The annealing may be performed at 350 to 550° C.

The features and advantages of the present invention will become apparent from the following description with reference to the accompanying drawings.

Prior to the detailed description of the invention, it should be understood that the terms and words used in the specification and the claims are not to be construed as having common and dictionary meanings but are construed as having meanings and concepts corresponding to the technical spirit of the present invention in view of the principle that the inventor can define properly the concept of the terms and words in order to describe his/her invention with the best method.

The catalytic active area of the $NiS_2$ catalyst according to the present invention can be increased through structural control, and at the same time, a highly active, specific plane of the $NiS_2$ catalyst is exposed, resulting in improved characteristics of a lithium-air battery using the $NiS_2$ catalyst.

In addition, the $NiS_2$ catalyst of the present invention has a two-dimensional structure, is highly active and stable, and can be produced on a large scale at low cost in a simple manner.

DETAILED DESCRIPTION OF THE INVENTION

Figure 1:
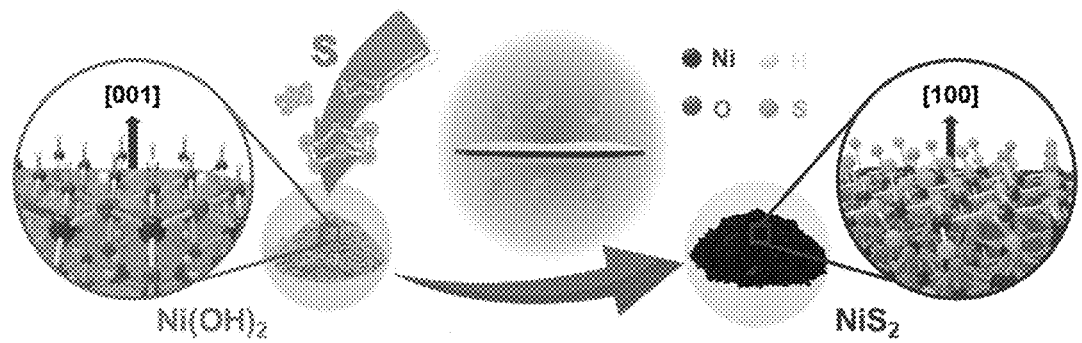
FIG. 1 is a schematic diagram showing a method for producing a catalyst for oxygen reduction and evolution reactions according to the present invention.

Other objects, advantages, and novel features of the invention will become more apparent from the following detailed description and preferred embodiments with reference to the appended drawings. In the drawings, the same elements are denoted by the same reference numerals even though they are depicted in different drawings. Although such terms as "first" and "second," etc. may be used to describe various elements, these elements should not be limited by above terms. These terms are used only to distinguish one element from another. In the description of the present invention, detailed explanations of related art are omitted when it is deemed that they may unnecessarily obscure the essence of the present invention.

Preferred embodiments of the present invention will now be described in detail with reference to the accompanying drawings.

A catalyst for oxygen reduction and evolution reactions according to one embodiment of the present invention is in the form of nickel sulfide ($NiS_2$) nanosheets wherein $NiS_2$ molecules are cross-linked and oriented two-dimensionally.

The bifunctional catalyst for both oxygen reduction reaction (ORR) and oxygen evolution reaction (OER) can be provided for a cathode of a lithium-air battery. When a lithium-air battery is discharged, lithium metal is oxidized at the anode to produce lithium ions and electrons. The lithium ions and the electrons move to the cathode through the electrolyte and circuit, respectively. Oxygen is reduced by the electrons at the cathode to form $Li_2O_2$. When the battery is charged, reverse reactions occur. That is, the lithium compound is decomposed to evolve oxygen gas at the cathode and the lithium ions are reduced at the anode. Such lithium-air batteries are estimated to have higher energy density than other next generation secondary batteries subsequent to lithium ion secondary batteries. However, conventional lithium-air batteries have a problem in that it is substantially impossible to reduce the difference in overpotential between the oxygen reduction reaction and the oxygen evolution reaction, failing to achieve relatively high electroactivity. The use of expensive precious metals such as gold and platinum (Pt) in conventional catalysts for the purpose of reducing the overpotential between the oxygen reduction reaction and the oxygen evolution reaction limits the commercialization of the catalysts. The catalyst for oxygen reduction and evolution reactions according to the present invention was invented as a solution to the problems of conventional lithium-air batteries.

Specifically, the catalyst for oxygen reduction and evolution reactions according to the present invention is in the form of nickel sulfide ($NiS_2$) nanosheets. In the $NiS_2$ nanosheets, $NiS_2$ molecules are cross-linked and oriented two-dimensionally. The $NiS_2$-based catalyst has high catalytic activity and is inexpensive. The $NiS_2$ catalyst is relatively highly active for the oxygen evolution reaction. Therefore, the $NiS_2$ catalyst can be utilized as a bifunctional catalyst for both oxygen reduction and oxygen evolution reactions. The $NiS_2$ catalyst has a two-dimensional structure of nanosheets through structural control. Due to this structure, the $NiS_2$ nanosheet catalyst has a large catalytically active area.

In addition, a highly active, specific plane of the $NiS_2$ nanosheet catalyst is exposed in a controlled manner, ensuring high activity of the catalyst for oxygen reduction and oxygen evolution reactions and long-term catalytic stability of the catalyst. The $NiS_2$ nanosheet catalyst has a single crystalline structure and its {200} crystal plane may be exposed.

Overall, according to the present invention, the use of the $NiS_2$ catalyst whose catalytically active area is increased through structural control and whose highly active, specific plane is exposed enables the fabrication of a lithium-air battery with high capacity and stability. That is, the $NiS_2$ catalyst of the present invention achieves improved activity for reversible reduction/oxidation reactions between lithium ions and oxygen and enhances the cycle stability of a lithium-air battery. In addition, the novel $NiS_2$ catalyst of the present invention is highly active and inexpensive compared to precious metal catalysts such as gold and platinum catalysts and is thus advantageous for commercialization.

Furthermore, the NiS$_2$ catalyst of the present invention can be produced in a simple manner by a method described hereinbelow. Therefore, the NiS$_2$ catalyst of the present invention can be produced on a large scale at low cost and is expected to contribute to the commercialization of lithium-air batteries in the near future.

The NiS$_2$ catalyst can be produced according to the following method. FIG. 1 is a schematic diagram showing a method for producing a catalyst for oxygen reduction and evolution reactions according to the present invention. As shown in FIG. 1, a method for producing a catalyst for oxygen reduction and evolution reactions according to one embodiment of the present invention includes synthesizing a nickel hydroxide (Ni(OH)$_2$) nanosheet precursor in which Ni(OH)$_2$ molecules are cross-linked and oriented two-dimensionally, and reacting the Ni(OH)$_2$ nanosheet precursor with sulfur to synthesize nickel sulfide (NiS$_2$) nanosheets.

First, a Ni(OH)$_2$ nanosheet precursor is synthesized by the following procedure. Nickel acetate is dissolved in deionized water to prepare a nickel acetate solution and an ammonium solution is added to the nickel acetate solution to prepare a mixed solution. The ammonium solution is added in such an amount that the pH of the mixed solution is 9 to 11, preferably 9.0 to 9.3, more preferably 9.1 to 9.2.

Next, the mixed solution is subjected to hydrothermal synthesis. The hydrothermal synthesis may be performed at 160 to 210° C., preferably 170 to 200° C., for 3 to 13 hours, preferably 4 to 12 hours.

After completion of the hydrothermal synthesis, the reaction product is cleaned with a cleaning liquid such as water or ethanol and dried to synthesize a Ni(OH)$_2$ nanosheet precursor. The Ni(OH)$_2$ nanosheet precursor is in the form of nanosheets in which Ni(OH)$_2$ molecules are cross-linked and oriented two-dimensionally.

Nickel sulfide (NiS$_2$) nanosheets can be synthesized from the Ni(OH)$_2$ nanosheet precursor by a solid/gas phase reaction.

The Ni(OH)$_2$ nanosheet precursor is allowed to react with sulfur (S) to synthesize NiS$_2$ nanosheets in which nickel sulfide (NiS$_2$) molecules are cross-linked and oriented two-dimensionally. Specifically, a sulfur powder is vaporized by annealing and the resulting sulfur vapor is allowed to react the Ni(OH)$_2$ nanosheet precursor. For example, the Ni(OH)$_2$ nanosheet precursor is placed at the center of a tube furnace, the sulfur powder is arranged upstream of the tube such that it is spaced a distance from the Ni(OH)$_2$ nanosheet precursor, and annealing is performed under a flow of argon (Ar) gas. Here, the distance between the Ni(OH)$_2$ nanosheet precursor and the sulfur powder may be adjusted to 5 to 12 cm. The molar ratio of the Ni(OH)$_2$ nanosheet precursor to the sulfur powder may be adjusted to 1:5-25. The annealing may be performed at 350 to 550° C. for 0.5 to 1.5 hours. In one embodiment, the annealing may be performed at a temperature of 400° C. for 1 hour and the molar ratio and distance between the Ni(OH)$_2$ nanosheet precursor and the sulfur may be adjusted to 1:20 and 7 cm, respectively. In an alternative embodiment, the annealing may be performed at a temperature of 500° C. for 1 hour and the molar ratio and distance between the Ni(OH)$_2$ nanosheet precursor and the sulfur may be adjusted to 1:20 and 10 cm, respectively.

The present invention will be explained in more detail with reference to the following examples, including evaluation examples.

Example 1: Synthesis of Ni(OH)$_2$ Precursors 0.08 mol of nickel acetate was sufficiently dissolved in 100 ml of water as a solvent, and an ammonium solution was added thereto to prepare mixed solutions in the range of pH 9-12. Each of the mixed solution was subjected to hydrothermal synthesis in the temperature range of 140° C. to 200° C. for 4-12 h while raising the temperature by 10° C. at 1 h intervals. After completion of the reaction, the reaction product was cleaned with water and ethanol and dried to synthesize a Ni(OH)$_2$ precursor.

Example 2: Synthesis of NiS$_2$ Catalysts

The Ni(OH)$_2$ precursor prepared by hydrothermal synthesis of the mixed solution of pH 9.17 at 170° C. for 12 h was placed at the center of a tube furnace and annealing was performed under a flow of 20 sccm argon (Ar) gas while adjusting the distance between a sulfur powder and from the precursor to 7-10 cm by 1 cm increments. Here, the molar ratio between the precursor and the sulfur powder was adjusted to 1:10 and 1:20 and the annealing was performed in the temperature range of 400–500° C. for 1 h while raising the temperature by 50° C. Various NiS$_2$ catalysts were produced under different synthesis conditions by varying the molar ratio and distance between the precursor and the sulfur powder and the annealing temperature.

Example 3: Fabrication of Lithium-Air Battery Using the NiS$_2$ Catalyst

The NiS$_2$ catalyst (45 wt %) produced in Example 2, Super P carbon black (45 wt %), and polytetrafluoroethylene (PTFE=10 wt %) were mixed and dispersed in ethanol as a solvent to prepare an electrode ink. 0.5 mg of the electrode ink was loaded into a nickel foam (diameter=1 cm) by dip coating and was then sufficiently dried. A cell composed of a cathode, an anode, a separator, and an electrolyte was prepared. The anode was a lithium foil and the electrolyte was N,N-dimethylacetamide (DMAc) in 1 M LiNO$_3$. 0.1 M 2,2,6,6-tetramethyl-1-piperidinyloxy (TEMPO) as an oxygen evolution reaction mediator was added to the electrolyte.

Example 4: Fabrication of Lithium-Air Battery Using the NiS$_2$ Catalyst

Lithium-air battery was fabricated in the same manner as in Example 3, except that Super P carbon black was not used and the NiS$_2$ catalyst (100 wt %) only was used.

Comparative Example 1: Fabrication of Lithium-Air Battery Using the Ni(OH)$_2$ Precursor as Catalyst A lithium-air battery was fabricated in the same manner as in Example 3, except that the Ni(OH)$_2$ precursor prepared in Example 1 was used as a catalyst instead of the NiS$_2$ catalyst.

Evaluation Example 1: Optimal Conditions for Ni(OH)$_2$ Precursor Synthesis

Figure 2A:
FIGS. 2a to 2c are scanning electron microscopy (SEM) images of $Ni(OH)_2$ precursors prepared in Example 1.
Figure 2B:
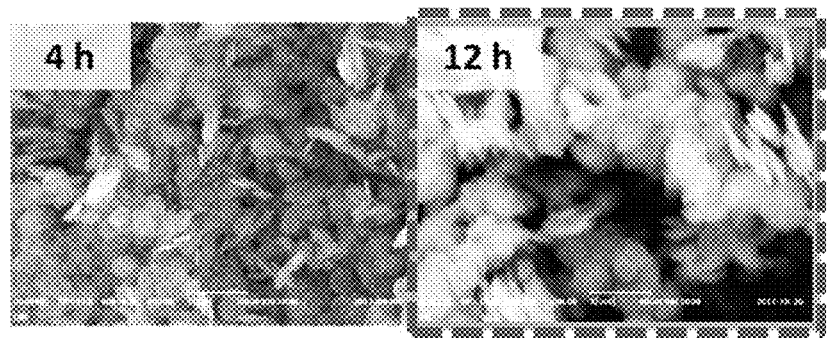
Figure 2C:
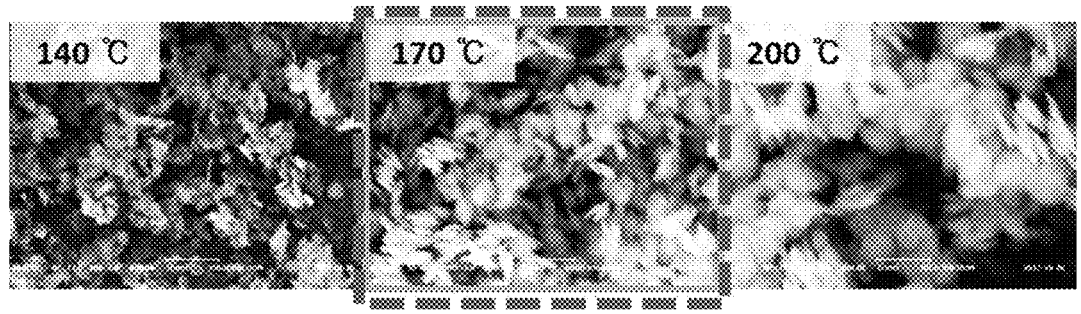

Scanning electron microscopy (SEM) images of the Ni(OH)$_2$ precursors synthesized in Example 1 were analyzed to obtain optimal conditions for Ni(OH)$_2$ precursor synthesis. FIGS. 2a to 2c are scanning electron microscopy (SEM) images of the Ni(OH)$_2$ precursors prepared in Example 1. Specifically, FIG. 2a shows SEM images of the Ni(OH)$_2$ precursors prepared by hydrothermal synthesis of the mixed solutions of different pH values at 200° C. for 4 h, FIG. 2b shows SEM images of the Ni(OH)$_2$ precursors prepared by hydrothermal synthesis of the mixed solutions at 200° C. for 4 h and 12 h. FIG. 2c shows SEM images of the Ni(OH)$_2$ precursors prepared by hydrothermal synthesis of the mixed solutions at 140° C., 170° C., and 200° C. for 12 h.

The Ni(OH)$_2$ precursor in the form of a sheet was more effectively synthesized when 0.08 mol of nickel acetate was sufficiently dissolved in 100 ml of water as a solvent, an ammonium solution was added thereto to prepare a mixed solution of pH 9.1-9.2, the mixed solution was subjected to hydrothermal synthesis at 170° C. for 12 h, and the reaction product was cleaned with water and ethanol and dried.

Evaluation Example 2: Optimal Conditions for NiS$_2$ Catalyst Synthesis

Figure 3A:
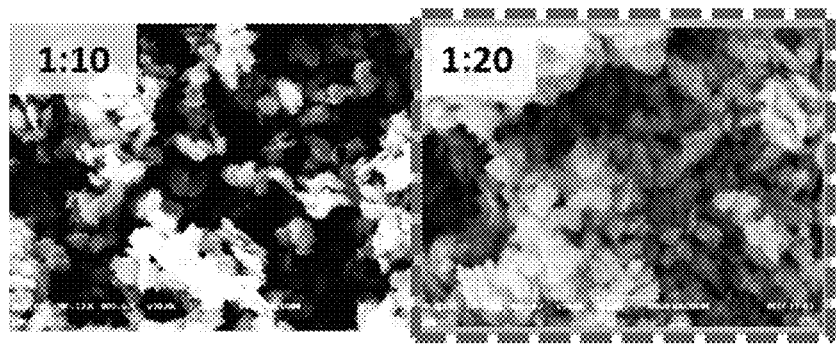
FIGS. 3a to 3e are scanning electron microscopy (SEM) images of $NiS_2$ catalysts prepared in Example 2.
Figure 3B:
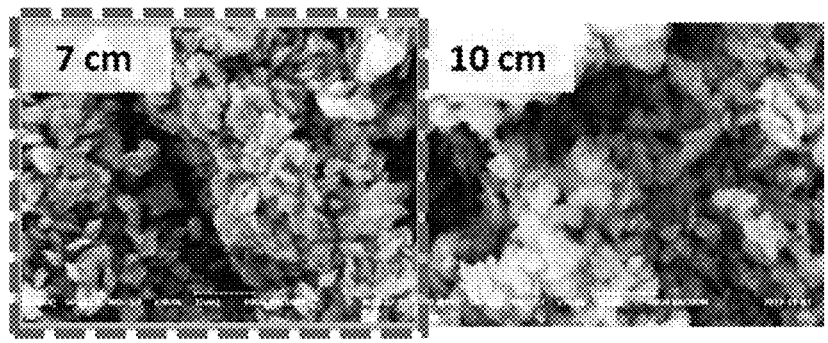
Figure 3C:
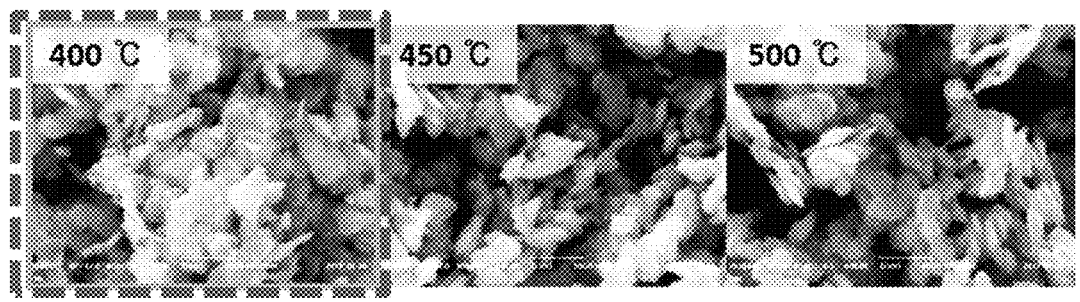
Figure 3D:
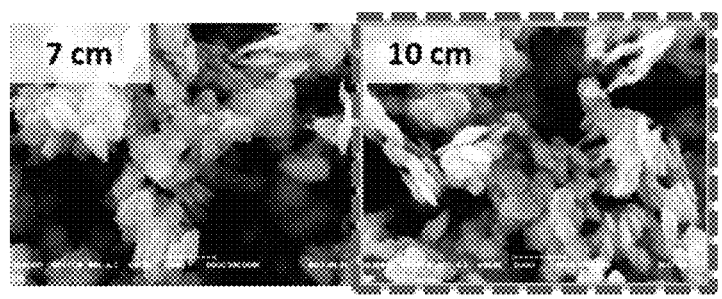
Figure 3E:
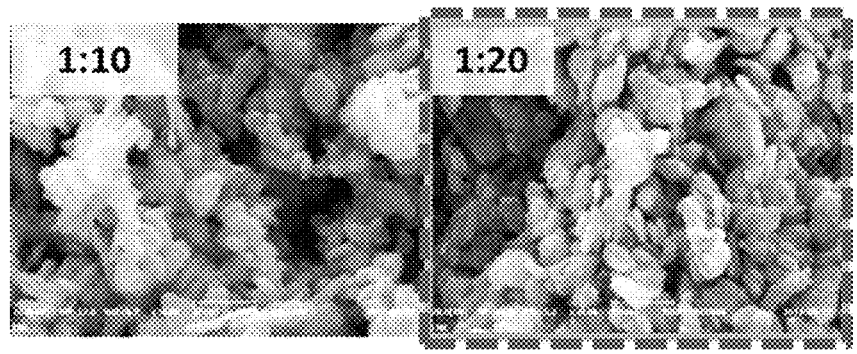

Scanning electron microscopy (SEM) images of the NiS$_2$ catalysts synthesized in Example 2 were analyzed to obtain optimal conditions for NiS$_2$ catalyst synthesis. FIGS. 3a to 3e are scanning electron microscopy (SEM) images of the NiS$_2$ catalysts produced in Example 2. Specifically, FIG. 3a shows SEM images of the NiS$_2$ catalysts produced by annealing at 400° C. for 1 h after the molar ratio of the precursor to the sulfur powder was adjusted to 1:10 and 1:20 and the distance between the precursor and the sulfur powder was adjusted to 10 cm. FIG. 3b shows SEM images of the NiS$_2$ catalysts produced by annealing at 400° C. for 1 h after the molar ratio of the precursor to the sulfur powder was adjusted to 1:20 and the distance between the precursor and the sulfur powder was adjusted to 7 cm and 10 cm. FIG. 3c shows SEM images of the NiS$_2$ catalysts produced by annealing at 400° C., 450° C., and 500° C. for 1 h after the molar ratio of the precursor to the sulfur powder was adjusted to 1:20 and the distance between the precursor and the sulfur powder was adjusted to 10 cm. FIG. 3d shows SEM images of the NiS$_2$ catalysts produced by annealing at 500° C. for 1 h after the molar ratio of the precursor to the sulfur powder was adjusted to 1:20 and the distance between the precursor and the sulfur powder was adjusted to 7 cm and 10 cm. FIG. 3e shows SEM images of the NiS$_2$ catalysts produced by annealing at 500° C. for 1 h after the molar ratio of the precursor to the sulfur powder was adjusted to 1:10 and 1:20 and the distance between the precursor and the sulfur powder was adjusted to 10 cm.

As revealed from these SEM images, the NiS$_2$ catalyst in the form of a sheet was effectively synthesized when the molar ratio of the precursor to the sulfur powder was adjusted to 1:20, the distance between the precursor and the sulfur powder was adjusted to 7-10 cm, and the annealing was performed at 400-500° C. for 1 h.

Figure 4:
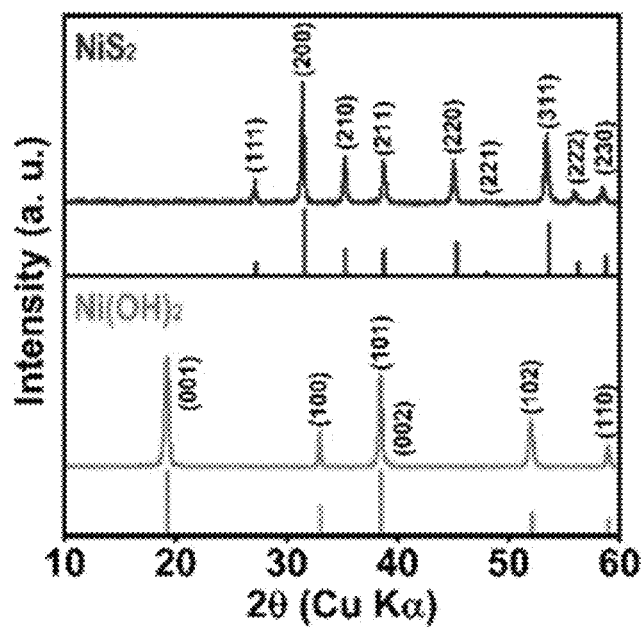
FIG. 4 shows X-ray diffraction (XRD) patterns of a $Ni(OH)_2$ precursor prepared in Example 1 and a $NiS_2$ catalyst produced in Example 2.
Figure 6:
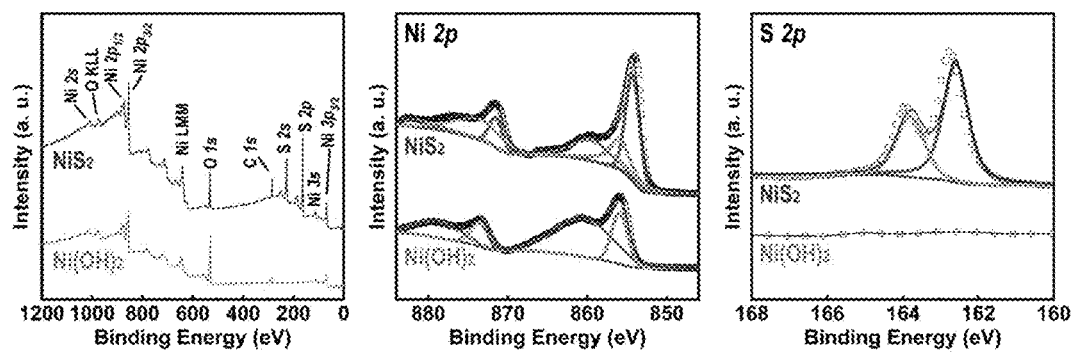
FIG. 6 shows X-ray photoelectron spectroscopy (XPS) spectra of a $Ni(OH)_2$ precursor prepared in Example 1 and a $NiS_2$ catalyst produced in Example 2.
Figure 7:
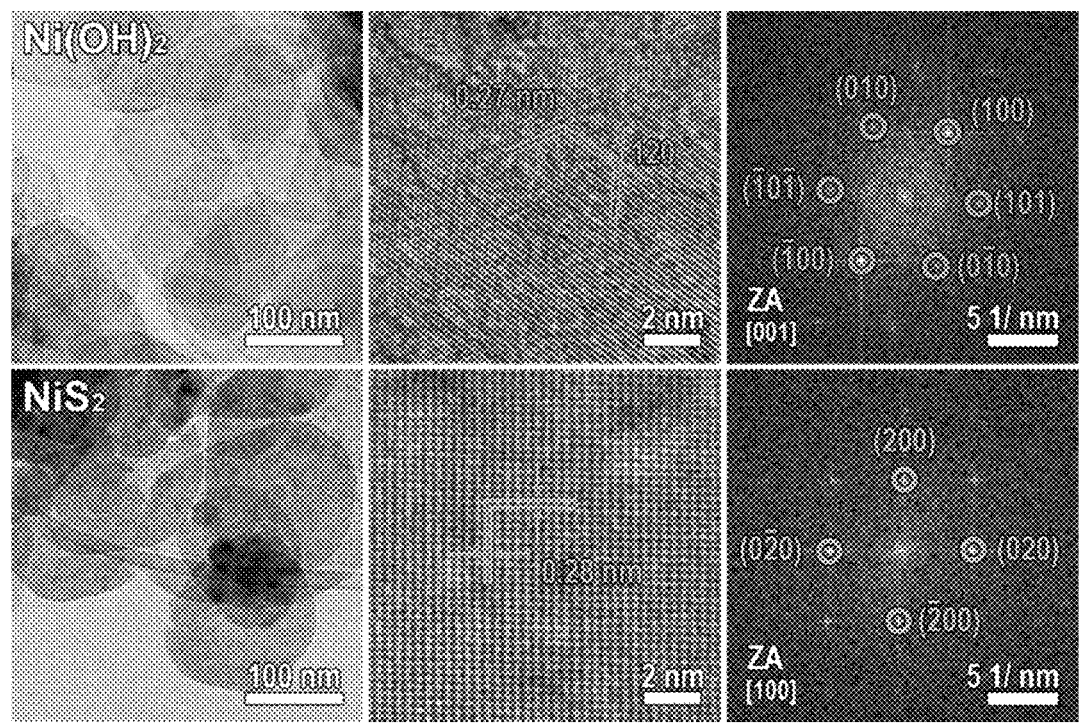
FIG. 7 shows transmission electron microscopy (TEM) images, high-resolution TEM images, and fast Fourier transform (FFT) patterns of a $Ni(OH)_2$ precursor prepared in Example 1 and a $NiS_2$ catalyst produced in Example 2.

Evaluation Example 3: Analysis of Structures and Bonding States of the Ni(OH)$_2$ Precursor and the NiS$_2$ Catalyst The structures of the Ni(OH)$_2$ precursor and the NiS$_2$ catalyst synthesized under the optimal conditions defined in Evaluation Examples 1 and 2, respectively, were analyzed from their X-ray diffraction (XRD) patterns, SEM images, X-ray photoelectron spectroscopy (XPS) spectra, and transmission electron microscopy (TEM) images. FIG. 4 shows X-ray diffraction (XRD) patterns of the Ni(OH)$_2$ precursor prepared in Example 1 and the NiS$_2$ catalyst produced in Example 2, FIG. 5 shows scanning electron microscopy (SEM) images of the Ni(OH)$_2$ precursor prepared in Example 1 and the NiS$_2$ catalyst produced in Example 2, FIG. 6 shows X-ray photoelectron spectroscopy (XPS) spectra of the Ni(OH)$_2$ precursor prepared in Example 1 and the NiS$_2$ catalyst produced in Example 2, and FIG. 7 shows transmission electron microscopy (TEM) images, high-resolution TEM images, and fast Fourier transform (FFT) patterns of the Ni(OH)$_2$ precursor prepared in Example 1 and the NiS$_2$ catalyst produced in Example 2.

Referring to the XRD patterns of FIG. 4, the precursor obtained by hydrothermal synthesis showed a pristine Ni(OH)$_2$ phase (the bottom of FIG. 4) and the Ni(OH)$_2$ was entirely converted to NiS$_2$ after the reaction with sulfur (the top of FIG. 4).

Figure 5:
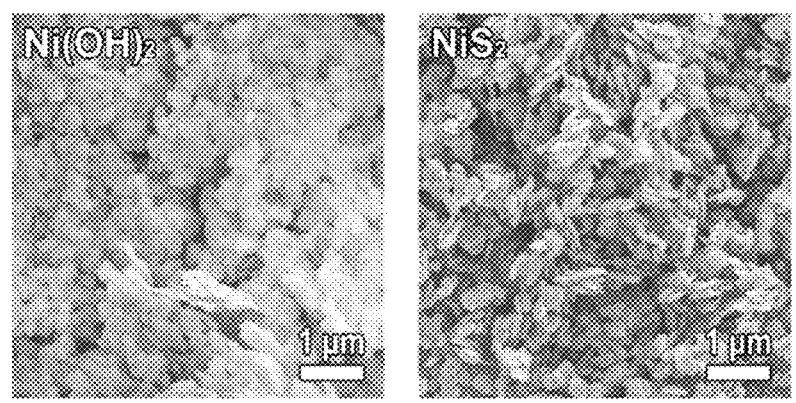
FIG. 5 shows scanning electron microscopy (SEM) images of a $Ni(OH)_2$ precursor prepared in Example 1 and a $NiS_2$ catalyst produced in Example 2.

The SEM images of FIG. 5 reveal that the precursor had a thin, sheet-like two-dimensional structure (the left of FIG. 5) and the NiS$_2$ catalyst had a sheet-like two-dimensional structure similar to that of the precursor.

The chemical bonding states of the compounds were confirmed by XPS analysis. As shown in FIG. 6, peaks corresponding to the Ni—O bond were present in the Ni 2p spectra of the Ni(OH)$_2$ precursor and the NiS$_2$ catalyst. The presence of the peaks in the NiS$_2$ catalyst indicates that the surface of the NiS$_2$ catalyst was slightly oxidized. Peaks corresponding to the Ni—S bond were observed in the S 2p spectrum of the NiS$_2$ catalyst but none of the peaks were observed in the S 2p spectrum of the Ni(OH)$_2$ precursor, indicating that the surface of the material was stabilized by elemental substitution.

The TEM images shown in FIG. 7 were analyzed to confirm crystal plane orientations. The Ni(OH)$_2$ precursor was in the form of nanosheets having a size of 100-200 nm (the top left of FIG. 7), which is in agreement with that observed in the SEM image. As a result of analyzing the high-resolution TEM (HRTEM) image (the top middle of FIG. 7), the Ni(OH)$_2$ precursor was confirmed to have continuous lattice fringes, indicating its high crystallinity. The three sets of lattice fringes had the same interplanar spacing (0.27 nm), which corresponds to the (100) crystal plane of hexagonal Ni(OH)$_2$ structure. The adjacent lattice fringes were at an angle of 120°. The FFT pattern on the top right of FIG. 7 reveals that the Ni(OH)$_2$ nanosheets had a single crystalline structure and their {001} crystal plane was exposed.

The TEM image on the bottom left of FIG. 7 reveals that the NiS$_2$ catalyst was in the form of a sheet and there was no morphological change between the NiS$_2$ catalyst and the Ni(OH)$_2$ nanosheets. The HRTEM image on the bottom middle of FIG. 7 shows that the NiS$_2$ nanosheets had clear lattice fringes and high crystallinity over the entire area. The two sets of lattice fringes had the same interplanar spacing below an angle of 90°, which corresponds to the {200} crystal plane of cubic NiS$_2$. Referring to the FFT pattern on the bottom right of FIG. 7, the NiS$_2$ nanosheets had a single crystalline structure and their {200} crystal plane was exposed.

Evaluation Example 4: Characterization of the Lithium-Air Batteries

Figure 8:
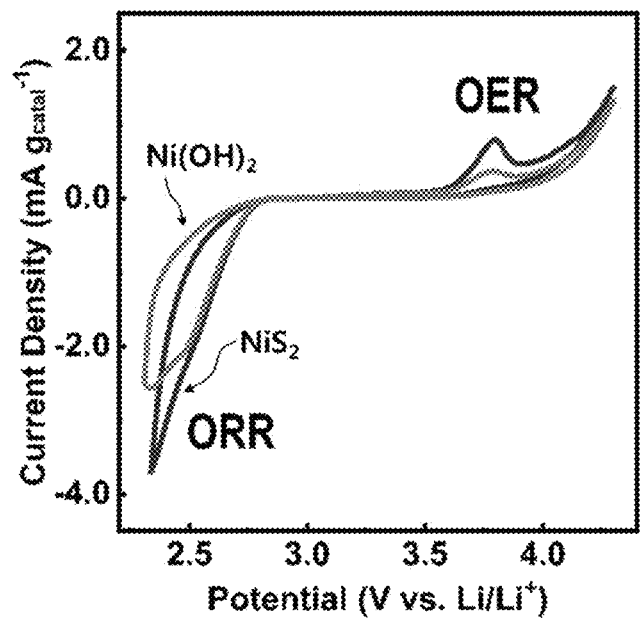
FIG. 8 shows the results of cyclic voltammetry for oxygen reduction/resolution reactions (ORR/OER) in lithium-air batteries fabricated in Example 3 and Comparative Example 1.
Figure 11:
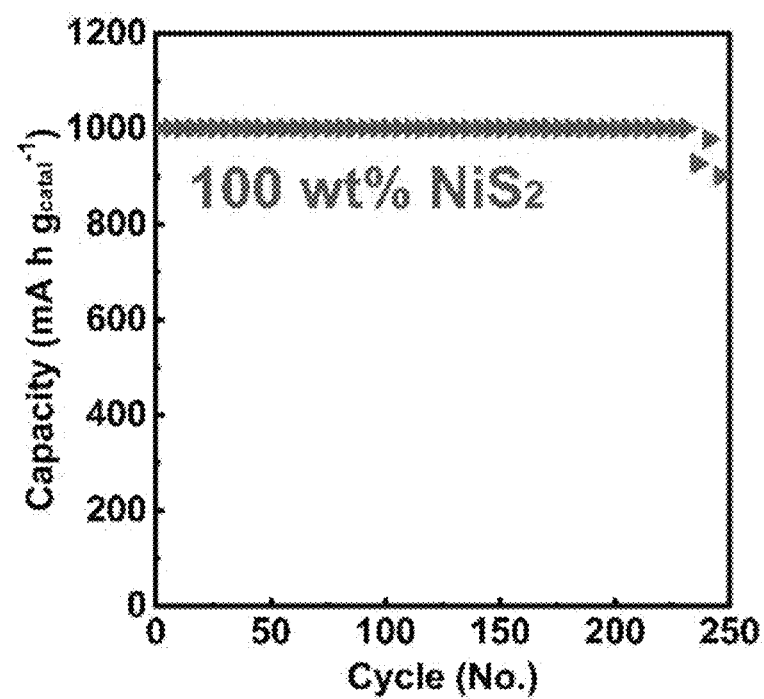
FIG. 11 shows the cycle stability of a lithium-air battery fabricated in Example 4.
Figure 12:
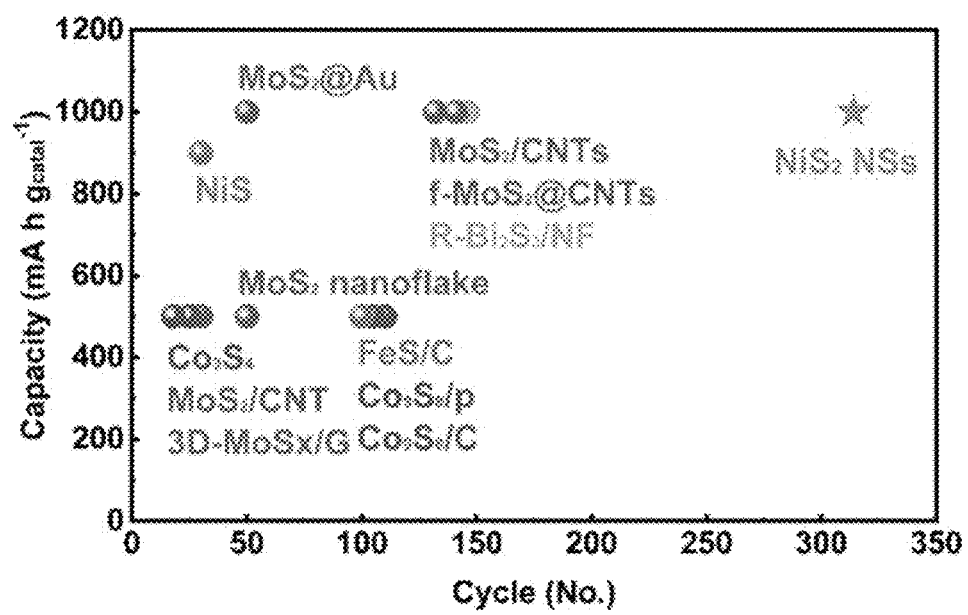
FIG. 12 compares the life characteristics of a $NiS_2$ catalyst produced in Example 2 with those of conventional transition metal sulfide compositions.

The lithium-air batteries fabricated in Example 3 and Comparative Example 1 were characterized to evaluate the effects of the NiS$_2$ catalyst. FIG. 8 shows the results of cyclic voltammetry for oxygen reduction/resolution reactions (ORR/OER) in the lithium-air batteries fabricated in Example 3 and Comparative Example 1, FIG. 9 compares the performance of the lithium-air battery fabricated in Example 3 with that of the lithium-air battery fabricated in Comparative Example 1, FIG. 10 shows scanning electron microscopy (SEM) images of the $NiS_2$ catalyst after discharging and charging of the lithium-air battery fabricated in Example 3, FIG. 11 shows the cycle stability of the lithium-air battery fabricated in Example 4, and FIG. 12 compares the life characteristics of the $NiS_2$ catalyst produced in Example 2 with those of conventional transition metal sulfide compositions.

In FIG. 8, the oxygen reduction reaction (ORR) and the oxygen evolution reaction (OER) were confirmed by cyclic voltammetry (CV). As a result, the lithium-air battery fabricated in Example 3 showed higher reaction current densities than the lithium-air battery fabricated in Comparative Example 1.

Figure 9:
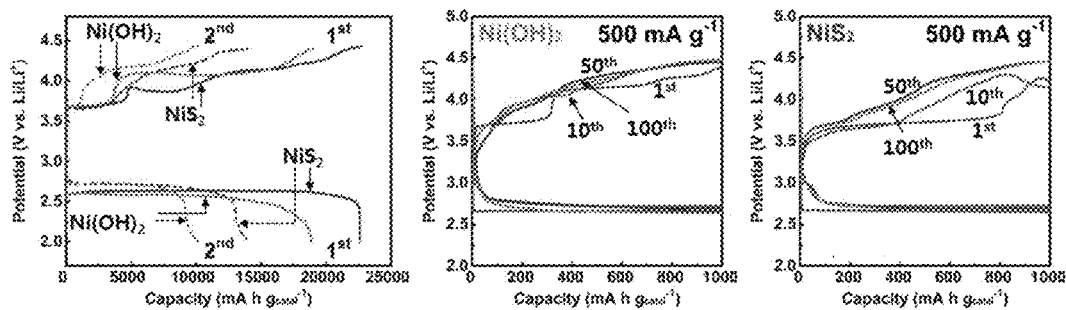
FIG. 9 compares the performance of a lithium-air battery fabricated in Example 3 with that of a lithium-air battery fabricated in Comparative Example 1.

FIG. 9 compares the characteristics of the lithium-air batteries fabricated in Example 3 and Comparative Example 1. The lithium-air battery of Example 3 had a full discharge capacity of 22500 $mAhg^{-1}$, which was found to be higher than that (18900 $mAhg^{-1}$) of the lithium-air battery of Comparative Example 1. When the characteristics of the lithium-air batteries were evaluated at a scan rate of 500 $mAg^{-1}$ with a limited capacity, the overpotential of the lithium-air battery of Example 3 was found to be relatively low compared to that of the lithium-air battery of Comparative Example 1.

Figure 10:
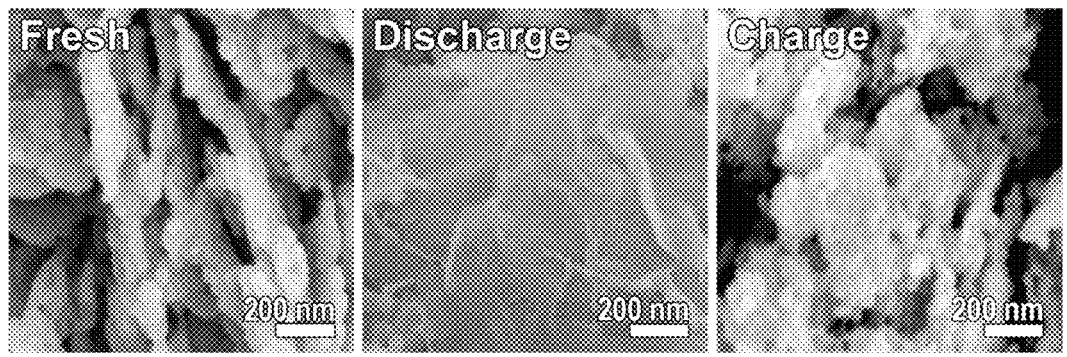
FIG. 10 shows scanning electron microscopy (SEM) images of a $NiS_2$ catalyst after discharging and charging of a lithium-air battery fabricated in Example 3.

FIG. 10 shows SEM images of $NiS_2$ after discharge and charge. The images confirm the morphology of the peroxide. The peroxide was produced in the form of thin sheets during discharge, and thereafter, it disappeared completely during charge.

The lithium-air battery fabricated using the 100 wt % $NiS_2$ catalyst without the addition of a conductive material for the ink preparation in Example 4 was characterized. The results are shown in FIG. 11. The lithium-air battery sustained 235 cycles with a limited capacity of 1000 $mAhg^{-1}$.

The cycle life characteristics of conventional transition metal sulfide compounds were compared with those of the $NiS_2$ compound. Referring to FIG. 12, the cycle life characteristics of the $NiS_2$ compound were superior to those of the conventional compounds.

Although the present invention has been described herein with reference to the specific embodiments, these embodiments do not serve to limit the invention and are set forth for illustrative purposes. It will be apparent to those skilled in the art that modifications and improvements can be made without departing from the spirit and scope of the invention.

Such simple modifications and improvements of the present invention belong to the scope of the present invention, and the specific scope of the present invention will be clearly defined by the appended claims.

What is claimed is:

1. A method for producing a catalyst for oxygen reduction and evolution reactions, comprising synthesizing a nickel hydroxide ($Ni(OH)_2$) nanosheet precursor in which $Ni(OH)_2$ molecules are cross-linked and oriented two-dimensionally, and reacting the $Ni(OH)_2$ nanosheet precursor with sulfur to synthesize nickel sulfide ($NiS_2$) nanosheets, wherein the synthesizing the $Ni(OH)_2$ nanosheet precursor comprises adding an ammonium solution to a solution of nickel acetate in deionized water to prepare a mixed solution.

2. The method according to claim 1, further comprising subjecting the mixed solution to hydrothermal synthesis.

3. The method according to claim 2, further comprising cleaning with a cleaning liquid and drying after the hydrothermal synthesis.

4. The method according to claim 2, wherein the hydrothermal synthesis is performed at 160 to 210° C.

5. The method according to claim 1, wherein the ammonium solution is added in such an amount that the pH of the mixed solution is 9 to 11.

6. The method according to claim 1, wherein the $NiS_2$ nanosheets are synthesized by annealing the sulfur and reacting the resulting sulfur vapor with the $Ni(OH)_2$ nanosheet precursor.

7. The method according to claim 6, wherein the $NiS_2$ nanosheets are synthesized by reaction of the $Ni(OH)_2$ nanosheet precursor and the sulfur in a molar ratio of 1:5-25.

8. The method according to claim 6, wherein the annealing is performed at 350 to 550° C.

* * * * *